(12) United States Patent  
Ferguson et al.

(10) Patent No.: US 7,864,052 B2  
(45) Date of Patent: Jan. 4, 2011

(54) MAIL DELIVERY TRACKING SYSTEM AND APPARATUS

(75) Inventors: Don Ferguson, Maple (CA); Mircea Paun, Mississauga (CA); Ioan Nicolescu, Mississauga (CA)

(73) Assignee: Lyngsoe Systems Ltd., Mississauga, Ontario (CA)

( * ) Notice: Subject to any disclaimer, the term of this patent is extended or adjusted under 35 U.S.C. 154(b) by 382 days.

(21) Appl. No.: 11/883,789

(22) PCT Filed: Jan. 25, 2006

(86) PCT No.: PCT/CA2006/000091

§ 371 (c)(1),
(2), (4) Date: Apr. 11, 2008

(87) PCT Pub. No.: WO2006/081652

PCT Pub. Date: Aug. 10, 2006

(65) Prior Publication Data

US 2008/0191877 A1    Aug. 14, 2008

Related U.S. Application Data

(60) Provisional application No. 60/650,138, filed on Feb. 7, 2005.

(51) Int. Cl.
*G08B 13/14* (2006.01)

(52) U.S. Cl. .................................. 340/572.1

(58) Field of Classification Search .............. 340/572.1, 340/568.1, 825.49, 825.69, 10.1, 539.1
See application file for complete search history.

(56) References Cited

U.S. PATENT DOCUMENTS

| 5,382,945 | A  |   | 1/1995  | Novak |
| 6,127,928 | A  | * | 10/2000 | Issacman et al. ......... 340/572.1 |
| 6,218,942 | B1 | * | 4/2001  | Vega et al. ............... 340/572.1 |
| 6,694,580 | B1 | * | 2/2004  | Hatzold ...................... 232/36 |
| 7,081,595 | B1 | * | 7/2006  | Brandt et al. ............... 209/584 |
| 2002/0175805 | A9 |  | 11/2002 | Armstrong et al. |
| 2003/0214387 | A1 |  | 11/2003 | Giaccherini |
| 2004/0246099 | A1 | * | 12/2004 | Tuttle ........................ 340/10.1 |

FOREIGN PATENT DOCUMENTS

WO    00/16278 A1    3/2000

* cited by examiner

*Primary Examiner*—Phung Nguyen
(74) *Attorney, Agent, or Firm*—Katten Muchin Rosenman LLP

(57) ABSTRACT

The present invention relates to a system that will permit the automatic measurement of the efficiencies of a delivery process from end to end. This system uses Radio Frequency based transponders and reader infrastructure to capture data as objects that contain RF transponders pass process points. In particular this invention permits the capture of delivery data automatically at the final end point. This invention is applicable in delivery applications such as those performed by post offices.

20 Claims, 5 Drawing Sheets

| UserData [ExciterID] | ExciterStatus | ExcitationiD | CRC | Flags |
|---|---|---|---|---|

FIGURE 3

MAIL DELIVERY TRACKING SYSTEM AND APPARATUS

FIELD OF THE INVENTION

The present invention relates generally to a system that is used to collect logistical process information, permitting track and trace and statistical analysis, where Radio Frequency Transponders are used in conjunction with strategically placed readers throughout a logistical process. In particular this invention relates to the last delivery measurement point usually at the end customer point whereby the invention permits the collection of delivery data automatically.

BACKGROUND OF THE INVENTION

There are systems in place to collect automatically the time and position of an object automatically. This equipment is typically installed throughout industrial and commercial facilities and permits automated collection or measurement of time of arrival data. Having particular regard to international mail, delivery fees are apportioned amongst co-operating postal services based upon an audit of the delivery time. Such an audit will involve sample mail pieces delivered to and from an auditor. According to the prior art, the last automated measurement of a sample mail piece occurs at the distribution centre. Collection of final delivery data of an object or item is performed manually, as in the case of test mail, or not at all. The current invention permits the automation of this process whereby this information can now be collected automatically.

SUMMARY OF THE INVENTION

According to one aspect of the present invention, there is provided a mail delivery measurement system comprising:
a excitation unit for installation on a delivery door,
and a remote reader unit,
wherein when a mailpiece is inserted through a slot in said delivery door, said excitation unit excites said mailpiece such that any radio frequency identification tag contained within the mailpiece communicates a corresponding identity to said remote reader unit.

According to another aspect of the present invention, there is provided an excitation unit for cooperation with a delivery door comprising:
an actuator for coupling to a flap covering a slot in said delivery door wherein when a mailpiece is inserted in said slot, said actuator is actuated,
a switch having a first and second position, coupled to said actuator, wherein when said actuator is actuated, said switch is in moved said first position, and otherwise, said switch remains in said second position,
a low frequency transmitter controlled so as to emit a signal when said switch is in said first position, said signal for the excitation of any radio frequency identification tags contained within said mailpiece.

BRIEF DESCRIPTION OF THE DRAWINGS

Preferred embodiments of the present invention will now be described, by way of example only, with reference to the attached Figures, wherein:

FIG. 3 shows the UHF message format of the mail slot exciter.

DETAILED DESCRIPTION

According to the present invention the Automatic End Point Measurement system is composed of a remote Reader positioned within the reception range of the point of entry of the object containing an RF transponder and in the case of the delivery of mail, a mail slot, but not limited to mail applications.

A battery operated excitation device is mounted on the inside of the mail slot. Its design is light weight and unobtrusive, easy to install and will accommodate various sizes of mail slots. The purpose of the mail slot exciter is to activate Radio Frequency Identification Transponders as they are passed through the mail slot. The excitation field that activates the RFID transponder device is active when mail passes through the slot. Upon activation the Radio Frequency Identification tag, in the case of Active tags, transmits a UHF signal and in the case of passive tags, reflects energy back, both signals containing Tag 10. The information transmitted is received by a reader mounted up to tens of meters from the point of entry. The tag identification data is time stamped and stored for later retransmission to a central data base for post processing. Retransmission of data can be either sent via the public telecom network or via wireless cellular service provider.

The reader unit can be battery operated or powered by the mains electrical power source on the premises.

The mail slot exciter 100 is part of an end to end postal application to determine the delivery time of the mail at the end location. In one embodiment, the mail slot exciter 100 is designed to be used together with the RM23 family of readers.

Figure 1:
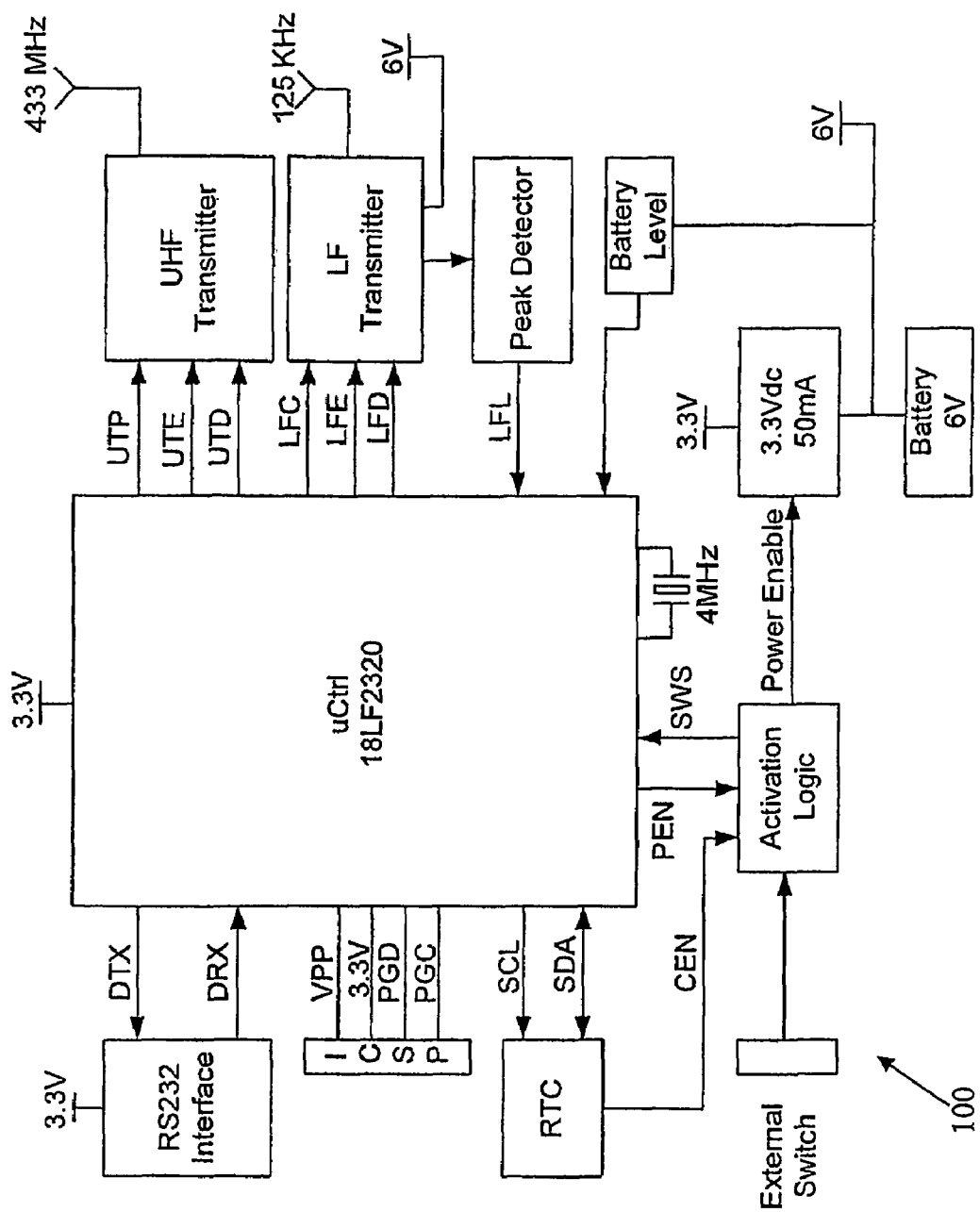
FIG. 1 shows a block diagram representation of a mail slot exciter.

The mail slot exciter 100 unit, as shown in FIG. 1, is a battery operated unit intended to be installed at the recipient location (dropper house) on the door mail slot. The unit will automatically generate the excitation field (format S21) when the mail slot flap is opened by the incoming mail. This way any tag type T95/T96/PT21, placed in the mail, will be activated and identified by the nearby Reader (such as an RM23) according to the S21 specification. Later on the messages received from tags will be transferred to the central data base using a dial-up or GSM/GPRS modem.

In order to save the battery power, the mail slot exciter 100 is most of the time in sleep conditions. It wakes up only after the mail slot flap is opened and then generates the LF excitation field, or at pre-determined time interval to send on UHF the integrity test messages.

The microcontroller generates signals for controlling the UHF and LF transmitters, the Real Time Clock (RTC), the RS232 interface and the Activation Logic Circuit. Optionally, the microcontroller may be an 18LF2320.

The microcontroller processes the signals received from the LF Peak Detector, the Battery Level Detector and the Activation Logic Circuit to generate the integrity test messages.

Figure 2:
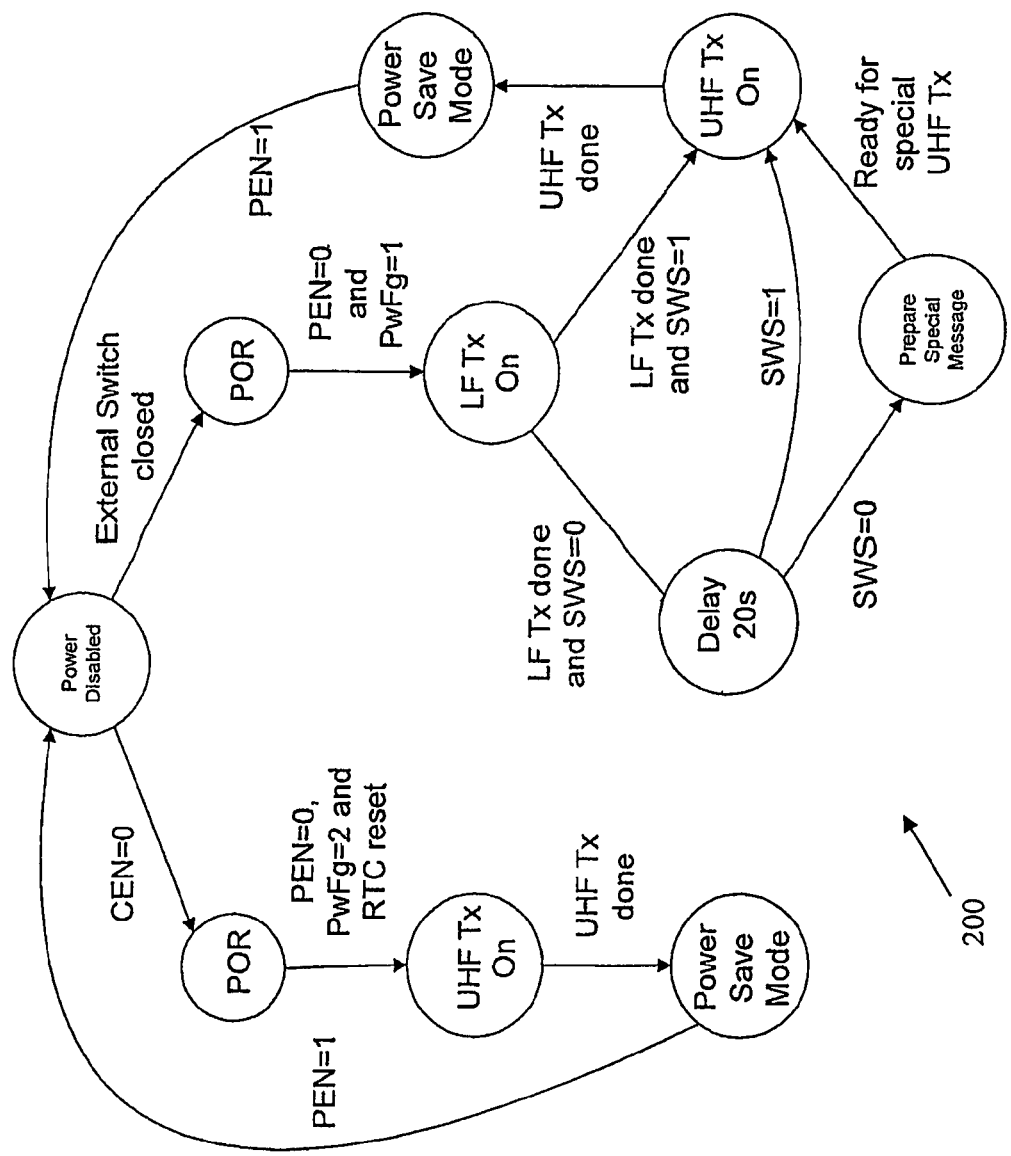
FIG. 2 shows a state diagram representation of the mail slot exciter functionality.

The mail slot exciter 100 functionality in the Operation Mode is explained by the states diagram 200 presented in FIG. 2.

In the Setting Mode the exciter EMB23 receives commands through the serial communication link, interprets these commands and executes them.

The mail slot exciter 100 has two main modes of operation: Setting and Operation. The Setting Mode of operation is intended to configure the functionality of the mail slot exciter 100 regarding: Excitation field; UHF Transmitter message format; Integrity test operation.

The Operation mode is the normal mode of operating the mail slot exciter 100 for automatic identification of the mail delivery time.

The functionality of the Exciter mail slot exciter 100 is controlled by a number of parameters and commands. These parameters may be transmitted from a PC running a serial communication program (Procomm) through an RS232 communication link and memorized by the exciter during its setting process. Of course, many other terminal sources may be used to deliver the parameters via the RS232 serial port. The same serial connections can be used to configure the Exciter mail slot exciter 100, with the desired functional parameters, or to query their memorized values.

The configuration of the exciter mail slot exciter 100 can be performed only in the Setting Mode of operation. This mode of operation can be entered by placing a jumper between the pins 2-4 of the ICSP header EMB23-J1 and switching on the mail slot exciter 100 power by opening its mail slot flap for at least 0.1 s.

The Operation Mode is active when there is no jumper placed between the pins 2-4 of the ICSP header EMB23-J1. This is the normal mode of operating Exciter mail slot exciter 100. In the Operation Mode mail slot exciter 100 is most of the time in sleep conditions to save the battery power. It wakes up only after the mail slot flap is open, to generate the LF excitation field, or at pre-determined time interval to send on UHF the integrity test messages.

In the Operation Mode mail slot exciter 100 generates automatically the excitation field for about 1 s after the mail slot flap is open; there is a delay of about 0.1s between the moment when the mail slot flap switch power on the mail slot exciter 100 and the moment when the LF excitation field is generated. The excitation filed is created by a 125 KHz carrier signal, modulated 00K with the ExcitationID code. The ExcitationID format and supports ID numbers from 0 to 31.

If the Exciter mail slot exciter 100 is activated in the Setting Mode, it can generate several types of signals, depending on a subsequent command:

non modulated 125 KHz carrier—command SM1;

125 KHz carrier, OOK modulated with a 600 Hz rectangular wave—command SM2;

125 KHz carrier, OOK modulated with the ExcitationID—command SM3; and

The modulated carrier is amplified and applied to the LF-PCB antenna.

The level of the LF voltage on the LF antenna is programmable using the parameter EVX.

An UHF transmission from mail slot exciter 100 is used to automatically test the functionality of the mail slot exciter 100, to check the reception capabilities of Readers and the UHF channel (434 MHz) operability.

In the Normal Mode of operation after the mail slot flap is open, Exciter mail slot exciter 100 generates the excitation field, and then transmits on the UHF channel the IntegritySignal. The IntegritySignal is a blink transmission consisting of a number of identical IntegrityMessages. Each IntegrityMessage reports the mail slot exciter 100 status. The number of IntegrityMessages per blink transmission is controlled by the parameter TIP.

In the setting mode the Exciter MAIL SLOT EXCITER 100 will transmit on the UHF channels RF signals as directed by the commands SM4 to SM7 (see Table 1).

If in the normal or operational mode of operation the Exciter MAIL SLOT EXCITER 100 mail slot flap is kept open longer than 20 s, a special LinkSignal will be generated on the UHF channel. The LinkSignal is intended to check if the associated Reader RM23 can receive the UHF messages transmitted by E23 from its specific installation location. The LinkSignal is a blink transmission consisting in a number of identical LinkMessages as described in chapter 5. The number of IntegrityMessages per blink transmission is controlled by the parameter TIP.

The commands and parameters operate only in the Setting Mode. The mail slot exciter 100 receives commands through the serial communication link, interprets these commands and executes them. Some commands set the functional parameters and others define actions.

All parameters, excepting TYYMMDDhhmm (RTC date and time), can be updated by transmitting to the mail slot exciter 100 (through the R5232 link) a command including the 3-letters name of the parameter and its value, according to the following syntactical expression:

<Parameter name>=<value><CR>

The TYYMMDDhhmm command (for RTC date and time update) has the syntax:

TYYMMDDhhmm<CR>—to update the RTC

T<CR>—toquerythrRTC

The actual values of the mail slot exciter 100 parameters can be read by transmitting through the RS232 link to the Exciter mail slot exciter 100 a query command including the 3-letter name of the parameter, according to the following syntactical expression:

<Parameter name><CR>

The commands B, C and SMI-5M7 are introduced to define actions.

The Mail box exciter BM23 transmits messages on the 433.92 MHz channel using the format presented in FIG. 3.

The UserData field has 5 bytes—C/OxFE/xxlxxlxx. The first byte is the character C and the second byte has fix value OxFE. The remaining 3 bytes represent the ExciterID number—unique number allocated from the factory to each unit (expressed in hexadecimal); it can be re-programmed using the parameter TUD.

The ExciterStatus field has 2 bytes. The first byte contains the Exciter LF Power Level and the second the status of the mail slot flap (activation switch). The first byte gives the value of the parameter EVA (bits 6 to 0 for the LF Pk-Pk Output Voltage) and an indicator (bit 7) concerning the relation between the value of EVA and the value of the parameter EVT (the LF Pk-Pk Output Voltage Threshold). If the value of bit 7 is "1" then EVA>EVT; if "0" then EVA~EVT. The second byte informs about the status of the mail slot exciter 100 activation switch—if the value of this byte is 0×54 this means that the switch returned to its normal status (open) in less than 20 seconds. If the value is 0×55 this means that the switch remained closed longer than 20s (out of order situation). Note: the switch is activated by the mail slot flap; it is open only when the flop is closed. The ExcitationID field has one byte and it's controlled by parameter EAD. This field can be used to differentiate between tags excited by different mail slot exciter 100 exciters in close vicinity. Can be used for further developments; factory setting is the default value 0×00.

The CRC and Flags field are identical with S21/S96 UHF message format: CRC field—2 bytes, Flag field—1 byte.

Figure 4:
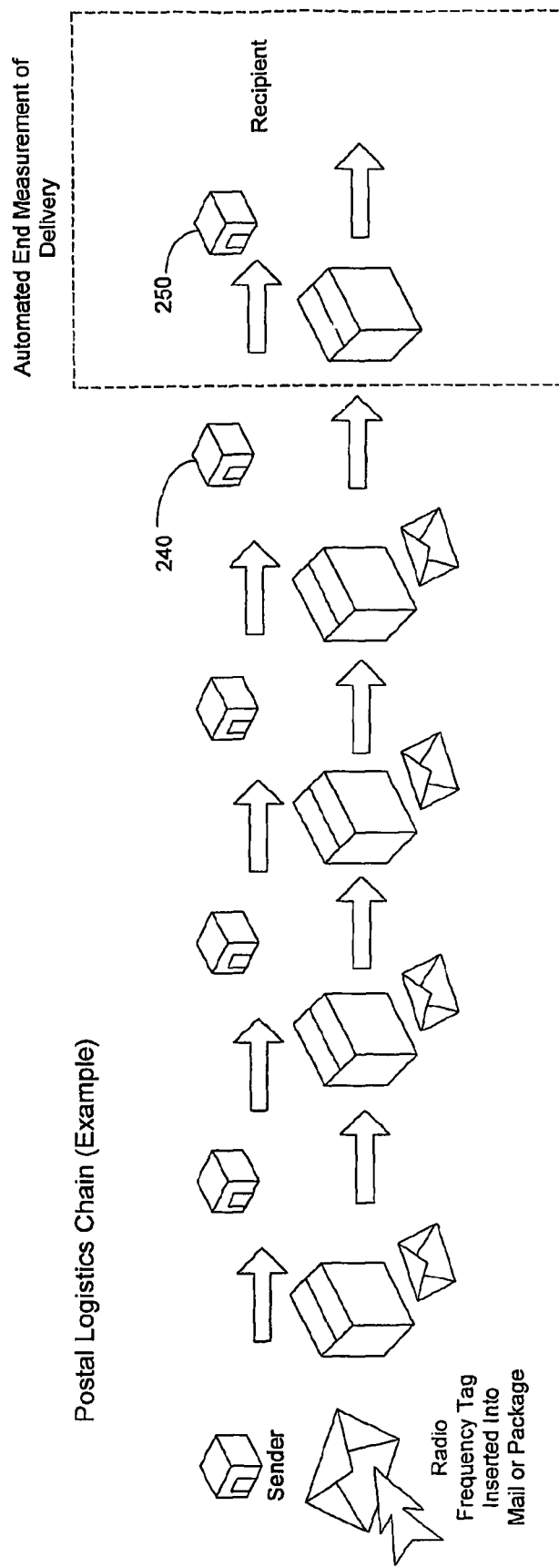
FIG. 4 shows a logistical delivery chain according to the art.
Figure 5A:
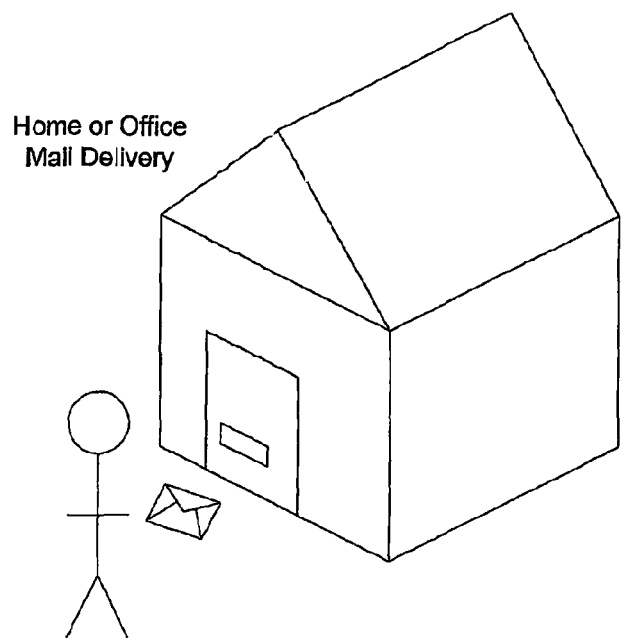
FIG. 5 shows a delivery chain endpoint according to the present invention.
Figure 5B:
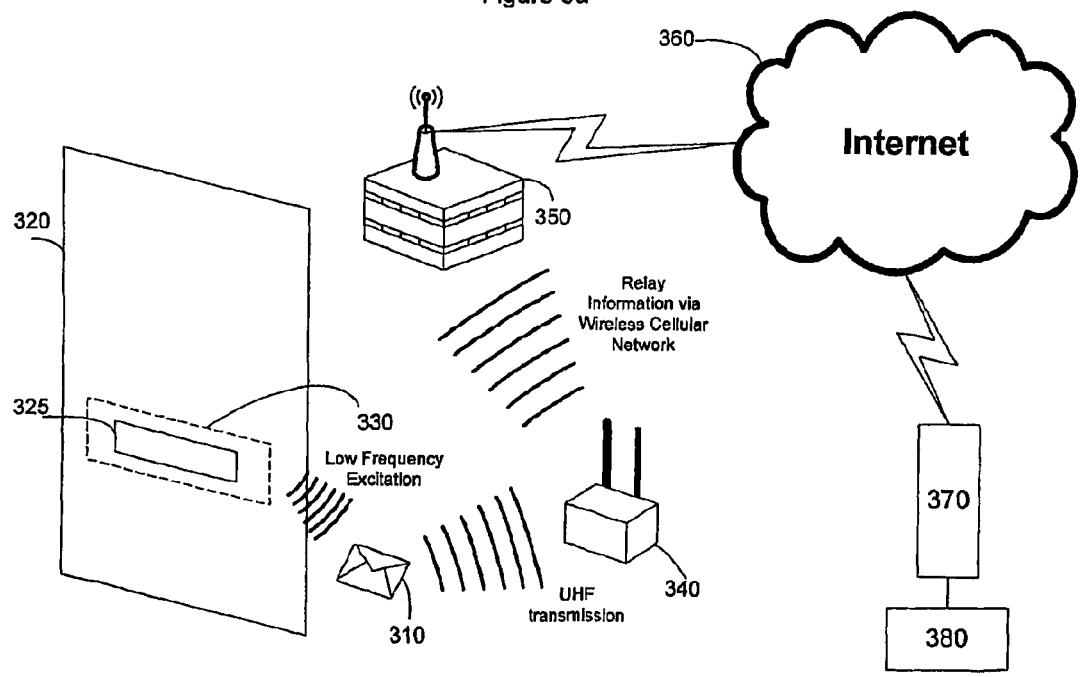

Having regard to FIGS. 5a and 5b, Mailpiece 310 is delivered to a final destination 301 having a door 320. The position of the endpoint is no different than an endpoint of the prior art (reference 250 of FIG. 4), a standard postal logistical chain. The door 320 incorporates slot 325. A portable excitation unit 330 (an instance of the exciter 100) is installed on the door slot 325. If the mailpiece 310 in question is for audit purposes, it will incorporate an RFID tag (not shown) included at a previous time in the delivery process.

When a mailpiece 310 is placed in the slot 325, the excitation unit is stimulated by the opening of the slot and responsively produces low frequency emissions (see section 3.3) in order to excite the tag included in the mailpiece. Upon activation the tag, transmits a UHF signal (433 Mhz). The signal includes an identification of the mailpiece 310.

The UHF signal information is received by a reader 340 (this may be, for example, and RM23 reader) mounted up to tens of meters from the door 320. The mailpiece 310 identification data is time stamped and stored for later retransmission to a central data base 370 for post processing. The database is stored on a server 370, which may be accessed via a wide area network 360. The reader may be connected to a wide area network access point 350 via telephone landline or cellular (GSM/CDMA/GPRS).

What is claimed:

1. A mail delivery measurement system comprising:
   a excitation unit for installation on a delivery door,
   and a remote reader unit,
   wherein when a mailpiece is inserted through a slot in said delivery door, said excitation unit excites said mailpiece such that any radio frequency identification tag contained within the mailpiece communicates a corresponding identity to said remote reader unit, and wherein power conservation mode is maintained by the excitation unit until opening of a flap covering said slot.

2. The system of claim 1 wherein when said flap is held in the open position for a predeteimined length of time, said excitation unit communicates directly with said remote reader unit.

3. The system of claim 1 wherein said remote reader unit stores the corresponding identity, time stamps the corresponding identity, and relays the corresponding identity immediately or at a later time for post processing.

4. The system of claim 1 wherein said excitation unit reverts to said power conservation mode after said excitation unit communicates said corresponding identity to said remote reader unit.

5. The system of claim 1 wherein the integrity of the system is determined by analyzing at least one integrity messages received.

6. The system of claim 1 wherein said excitation unit is capable of transmitting diagnostic messages on UHF and wherein said remote read unit is capable of indicating reception of said diagnostic messages.

7. The system of claim 6 wherein said diagnostic messages include battery low messages.

8. A mail delivery measurement system comprising:
   a excitation unit for installation on a delivery door,
   and a remote reader unit,
   wherein when a mailpiece is inserted through a slot in said delivery door, said excitation unit excites said mailpiece such that any radio frequency identification tag contained within the mailpiece communicates a corresponding identity to said remote reader unit, and
   wherein said excitation unit is capable of transmitting diagnostic messages on UHF and wherein said remote read unit is capable of indicating reception of said diagnostic messages.

9. The system of claim 8 wherein said diagnostic messages include battery low messages.

10. A mail delivery tracking system comprising:
    an excitation unit configured to be associated with a mail slot; and
    a remote reader unit; wherein
    in the event a mailpiece is inserted through the mail slot, the excitation unit produces an excitation signal to excite a radio frequency tag contained within the mailpiece to communicate its identity to the remote reader unit; and otherwise
    the excitation unit maintains a power conservation mode.

11. The system of claim 10, wherein the excitation unit is associated with a flap for covering said mail slot, wherein movement of said flap to an open position causes the excitation unit to produce the excitation signal.

12. The system of claim 11, wherein in the event said flap is held in the open position for a predetermined length of time, said excitation unit communicates directly with said remote reader unit.

13. The system of claim 10, wherein the remote reader unit is configured to receive the corresponding identity, and to store and associate a time stamp with the corresponding identity.

14. The system of claim 13, wherein the remote reader unit is configured to relay the time stamped identity.

15. The system of claim 14, wherein the remote reader unit is configurable to relay the time stamped identity either immediately or at a later time.

16. The system of claim 10, wherein said excitation unit reverts to said power conservation mode after said excitation unit communicates said corresponding identity to said remote reader unit.

17. The system of claim 10, wherein said excitation unit is capable of transmitting diagnostic messages on UHF and wherein said remote reader unit is capable of indicating reception of said diagnostic messages.

18. The system of claim 17 wherein said diagnostic messages include battery low messages.

19. A mail delivery tracking system comprising:
    an excitation unit configured to be associated with a mail slot; and
    a remote reader unit;
    wherein in the event a mailpiece is inserted through the mail slot, the excitation unit produces an excitation signal to excite a radio frequency tag contained within the mailpiece to communicate its identity to the remote reader unit;
    wherein said excitation unit is capable of transmitting diagnostic messages on UHF and wherein said remote reader unit is capable of indicating reception of said diagnostic messages.

20. The system of claim 19 wherein said diagnostic messages include battery low messages.

* * * * *